United States Patent [19]
Yamamoto

[11] Patent Number: 5,377,117
[45] Date of Patent: Dec. 27, 1994

[54] NUMERICAL CONTROL APPARATUS HAVING A THREE-DIMENSIONAL GRAPHIC DISPLAY FUNCTION

[75] Inventor: Kyoichi Yamamoto, Niwa, Japan
[73] Assignee: Okuma Corporation, Aichi, Japan
[21] Appl. No.: 84,613
[22] Filed: Jul. 1, 1993
[30] Foreign Application Priority Data
  Jul. 3, 1992 [JP] Japan ............... 4-200709
[51] Int. Cl.⁵ .............................. G06F 15/46
[52] U.S. Cl. .................... 364/474.22; 364/474.2; 364/188
[58] Field of Search ......... 364/188, 474.2, 474.22; 340/825.23; 318/563, 565

[56] References Cited
U.S. PATENT DOCUMENTS
4,720,796  1/1988  Kishi et al. ............ 364/474.2
4,879,667  11/1989 Gorski et al. ........... 364/474.24
5,043,906  8/1991  Jepson ................. 364/474.34
5,282,143  1/1994  Shirai et al. ............ 364/474.2

FOREIGN PATENT DOCUMENTS
60-189011  9/1985  Japan .

Primary Examiner—Paul Gordon
Attorney, Agent, or Firm—Wenderoth, Lind & Ponack

[57] ABSTRACT

A numerical control apparatus having a three-dimensional graphic display function is provided. A three-dimensional space is divided into lattice points in storing the form data of a workpiece and a tool. When the same lattice data of a plane including an X-axis and Y-axis of three-dimensional coordinates is continuous in a Z-direction, i.e., the same form continues, those lattice point data are stored using a piece of lattice data and a continuity number, and the lattice data are stored in the form of a list of links. This allows the form data of the workpiece and tool to be stored using a small memory capacity and the accuracy of display to be improved where needed without increasing the memory capacity.

16 Claims, 22 Drawing Sheets

X-Y PLANE IS DIVIDED INTO LATTICE POINTS

SECTION OF WORKPIECE REPRESENTED WITH BUNDLE OF LINE SEGMENTS USING DATA IN DIRECTION OF HEIGHT

HAVING DATA IN HEIGHT DIRECTION FOR EACH LATTICE POINT

REPRESENTATION OF OVERALL IMAGE OF WORKPIECE
USING CONTINUOUS SECTIONS OF WORKPIECE

THREE DIMENSIONAL SPACE IS DIVIDED INTO LATTICE POINTS

EXAMPLE OF EXTRACTION OF A SECTION PARALLEL WITH X-Z PLANE

PRESENCE OF ABSENCE OF FORM IS REPRESENTED BY TURNING ON/OFF OF EACH LATTICE POINT

REPRESENTATION OF OVERALL IMAGE OF WORKPIECE
BY TURNING ON/OFF EACH LATTICE POINT

THIRD LATTICE DATA
  CONTINUITY NUMBER = 3
  CONTINUITY NUMBER = 2
SECOND LATTICE DATA

FIRST LATTICE DATA
  CONTINUITY NUMBER = 6

MATERIAL

| PHYSICAL ADDRESS | LATTICE DATA | LATTICE CONTINUITY DATA |
|---|---|---|
| 0 | — | LINK DATA = 1 |
| 1 | | CONTINUITY NUMBER DATA = 6<br><br>LINK DATA = 2 |
| 2 | | CONTINUITY NUMBER DATA = 2<br><br>LINK DATA = 3 |
| 3 | | CONTINUITY NUMBER DATA = 3<br><br>LINK DATA = END |

FIG. 15A

B BEFORE LATTICE DATA IS DELETED

| PHYSICAL ADDRESS | LATTICE DATA | LATTICE CONTINUITY DATA |
|---|---|---|
| 0 | – | LINK DATA = 1<br>CONTINUITY NUMBER DATA = * |
| 1 | F | LINK DATA = 2<br>CONTINUITY NUMBER DATA = 9 |
| 2 | E | LINK DATA = 3<br>CONTINUITY NUMBER DATA = 3 |
| 3 | D | LINK DATA = 4<br>CONTINUITY NUMBER DATA = 1 |
| 4 | C | LINK DATA = 5<br>CONTINUITY NUMBER DATA = 1 |
| 5 | B | LINK DATA = 6<br>CONTINUITY NUMBER DATA = 1 |
| 6 | A | LINK DATA = END<br>CONTINUITY NUMBER DATA = 1 |

FIG. 15B

B AFTER LATTICE DATA IS DELETED

| PHYSICAL ADDRESS | LATTICE DATA | LATTICE CONTINUITY DATA |
|---|---|---|
| 0 | – | LINK DATA = 1<br>CONTINUITY NUMBER DATA = * |
| 1 | F | LINK DATA = 3<br>CONTINUITY NUMBER DATA = 9 |
| 2 | E | LINK DATA = 3<br>CONTINUITY NUMBER DATA = 3 |
| 3 | D | LINK DATA = 4<br>CONTINUITY NUMBER DATA = 1 |
| 4 | C | LINK DATA = 6<br>CONTINUITY NUMBER DATA = 2 |
| 5 | – | LINK DATA = -1<br>CONTINUITY NUMBER DATA = * |
| 6 | A | LINK DATA = END<br>CONTINUITY NUMBER DATA = 1 |

* PHYSICAL ADDRESS 5 BECOMES REUSABLE

FIG. 17
| PHYSICAL ADDRESS | LATTICE DATA | LATTICE CONTINUITY DATA |
|---|---|---|
| 0 | — | LINK DATA = 1 |
| 1 | 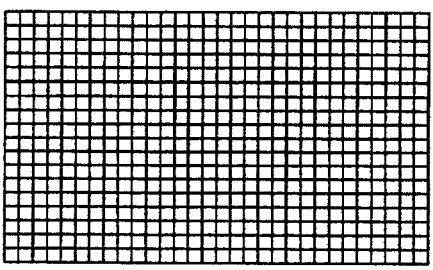 | CONTINUITY NUMBER<br>DATA = 6<br>LINK DATA = 2 |
| 2 | 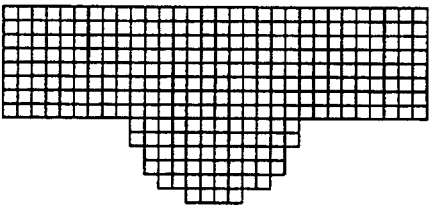 | CONTINUITY NUMBER<br>DATA = 1<br>LINK DATA = 4 |
| 3 | 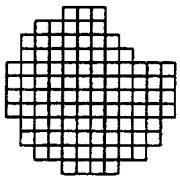 | CONTINUITY NUMBER<br>DATA = 3<br>LINK DATA = END |
| 4 | 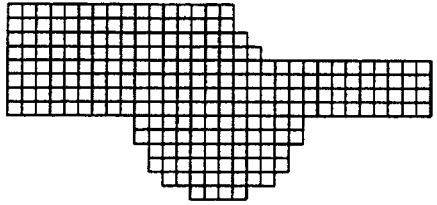 | CONTINUITY NUMBER<br>DATA = 1<br>LINK DATA = 3 |

ORIGINAL FORM

* THE SAME FORM IS
  CONTINUOUS IN Y-DIRECTION

DOUBLE THE ACCURACY OF DISPLAY

THE NUMBER OF
LATTICE DATA = 6

THE NUMBER OF
LATTICE DATA = 9

NUMERICAL CONTROL APPARATUS HAVING A THREE-DIMENSIONAL GRAPHIC DISPLAY FUNCTION

BACKGROUND OF THE INVENTION

1. Field of the Invention

The present invention relates to a numerical control apparatus having a three-dimensional graphic display function and, more particularly, to a numerical control apparatus having a three-dimensional display function for providing three-dimensional simulation of the processing of a form defined in a three-dimensional space.

2. Description of the Prior Art

In the numerical control apparatus (hereinafter referred to as NC apparatus) having a graphic display function, a method has been put into practical use in which processing is three-dimensionally simulated in a three-dimensional space using the forms of a workpiece and a tool defined in a three-dimensional space. Specifically, the method described below are for defining the forms of a workpiece and a tool in a three-dimensional space as follows.

First, there is a method wherein a plane including two of three-dimensional coordinate axes is divided into lattice points as shown in FIG. 1A; the height data of a workpiece and a tool are applied to each lattice point as shown in FIG. 1B; and the display of the forms of the workpiece and the tool is constructed as shown in FIG. 1C based on the data (refer to Japanese Patent Laid-open No. 189011/1985).

In this method, the data of the forms of a workpiece and a tool are handled on the assumption that there is no discontinuity in the forms of the workpiece and the tool in the direction of the axis perpendicular to the plane divided into lattice points. Therefore, for example, even if a workpiece is divided into 256 steps in the direction of the axis perpendicular to the plane divided into lattice points, these steps can be represented by a minimum of 8 bits and, therefore, there is an advantage that the form data of a workpiece and a tool can be stored using a small memory capacity.

Next, there is a method wherein a three-dimensional space as a whole is divided into lattice points as shown in FIG. 2A; the form data of a workpiece and a tool are represented using binary data for each lattice point as shown in FIG. 2B; and the display of the forms of the workpiece and the tool is constructed as shown in FIG. 2C. This method is advantageous in that it allows display of any kind of processing because every lattice point can have arbitrary binary data.

Although the above-described conventional three-dimensional graphic methods have the noted advantages, they also suffer the following problems. In the former method, since it is assumed that there is no discontinuity in the workpiece and the tool, a problem exists in that the display can not be appropriate for processing wherein the center axis of the tool is included in the plane on which the lattice points are defined (multi-plane processing). In the latter method, if a workpiece is divided into 256 steps in the direction of one of the axes, for example, at least 256 bits are required to represent these steps. In other words, there is a problem in that a large amount of memory capacity is required.

In either method, since the entire form data is handled without adding weight, portions which have gone though a roughing process and portions under a finishing process in progress are represented in the same level of accuracy. In other words, in order to improve the accuracy of display in a certain portion, it is necessary to increase the number of lattice points accordingly, resulting in a problem in that the memory capacity must be increased.

SUMMARY OF THE INVENTION

The present invention has been conceived taking the above-described situation into consideration, and it is an object of the present invention to provide a numerical control apparatus having a three-dimensional display function wherein the display can be appropriately obtained for any kind of processing; the form data of a workpiece and a tool can be stored using a small memory capacity; and the accuracy of display can be improved for portions where it is needed without any increase in memory capacity.

According to one aspect of the present invention, for achieving the object described above, there is provided a numerical control apparatus having a three-dimensional graphic display function including a first input section for inputting the form data of a workpiece in a three-dimensional coordinate system, a second input section for inputting the form data of a tool in a three-dimensional coordinate system, and a lattice data generating section for converting the form data for the workpiece and the tool input with said first and second input section into binary data of lattice points in a preset size on the three-dimensional coordinate system, generating lattice data by combining a lattice point coordinate value in the direction of one of the coordinate axes of the three-dimensional coordinate system and the lattice point binary data on a plane including the remaining two axes, and generating, as lattice continuity data, a physical address indicating the memory location of the lattice data in a memory area and link data indicating the memory location of the lattice data for the lattice coordinate value following the lattice data among lattice point coordinate values in the direction of the one axis. The apparatus further includes a lattice data changing section for changing the contents of the lattice data of the workpiece by obtaining the areas in which the lattice data of the workpiece and the lattice data of the tool interfere with each other through numerical operations and by subtracting the areas of interference from the lattice data of the workpiece, a lattice data adding section for adding new lattice data to a memory area available in the existing memory areas for the lattice data of the workpiece when the lattice data for the workpiece has not been displaced in the position in the lattice coordinate values in the direction of the one axis in which the lattice data of the tool has been displaced and for changing the link data in accordance with the addition, and a lattice continuity data changing section for changing the lattice continuity data in accordance with the change in the lattice data of the workpiece. A display section is also provided for generating image data based on the lattice data and lattice continuity data of the workpiece and the tool and for displaying the forms of the workpiece and the form of the tool on a graphic display device.

The nature, principle and utility of the invention will become more apparent from the following detailed description when read in conjunction with the accompanying drawings.

BRIEF DESCRIPTION OF THE DRAWINGS

In the accompanying drawings:

FIGS. 15A and 15B are views showing an example of the state of lattice continuity data when lattice data is deleted by the apparatus of the present invention;

FIG. 17 is a view showing an example of a manner in which form data is stored when lattice data is added by the apparatus of the present invention.

DETAILED DESCRIPTION OF THE PREFERRED EMBODIMENT

Figure 1A:
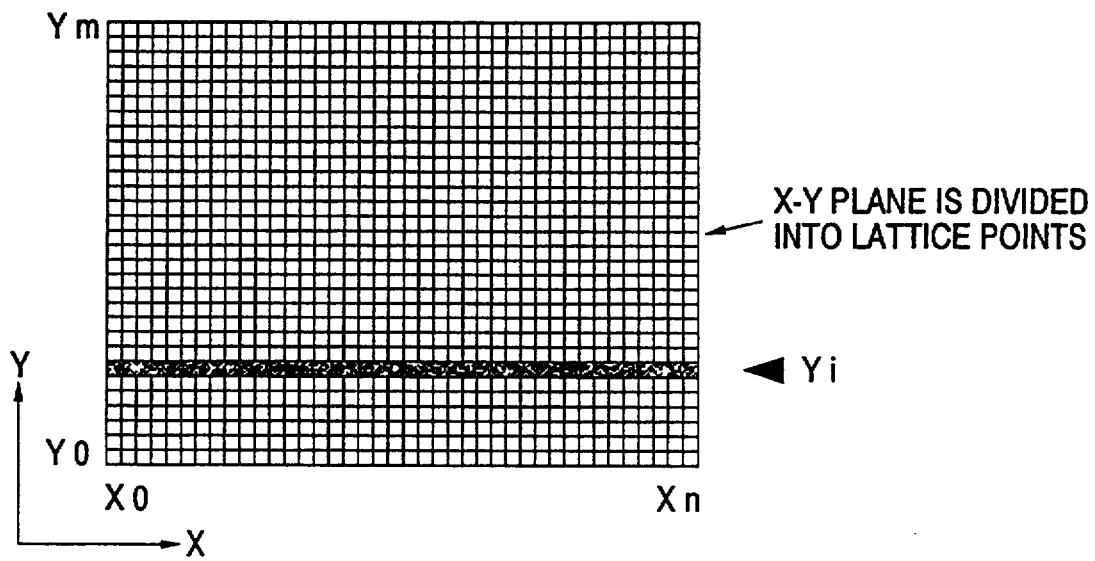
FIGS. 1A, 1B and 1C are views illustrating a first example of a conventional NC apparatus having a three-dimensional graphic display function.
Figure 1B:
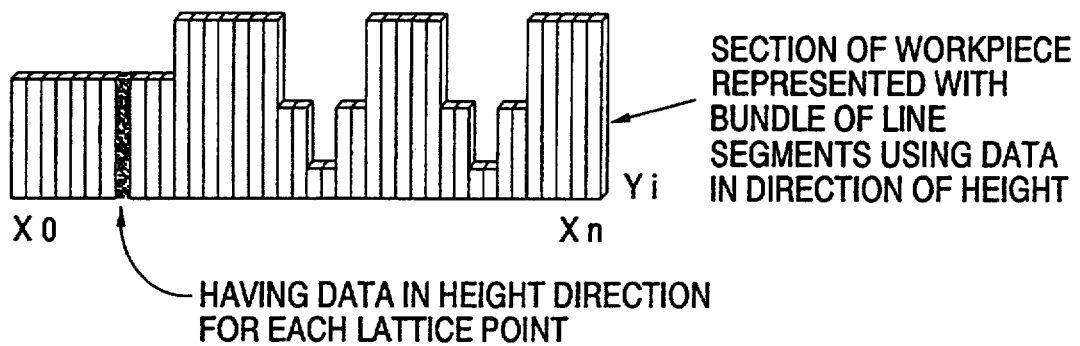
Figure 1C:
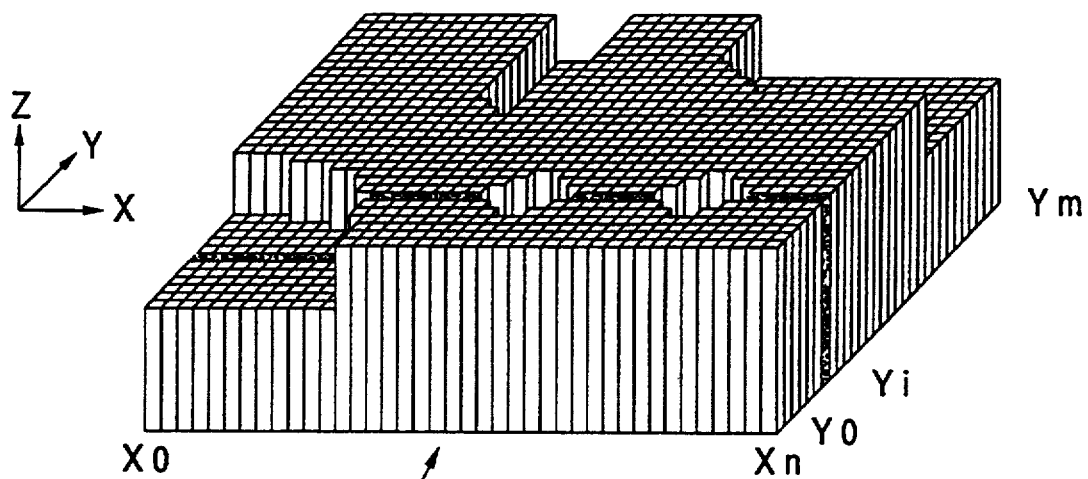
Figure 2A:
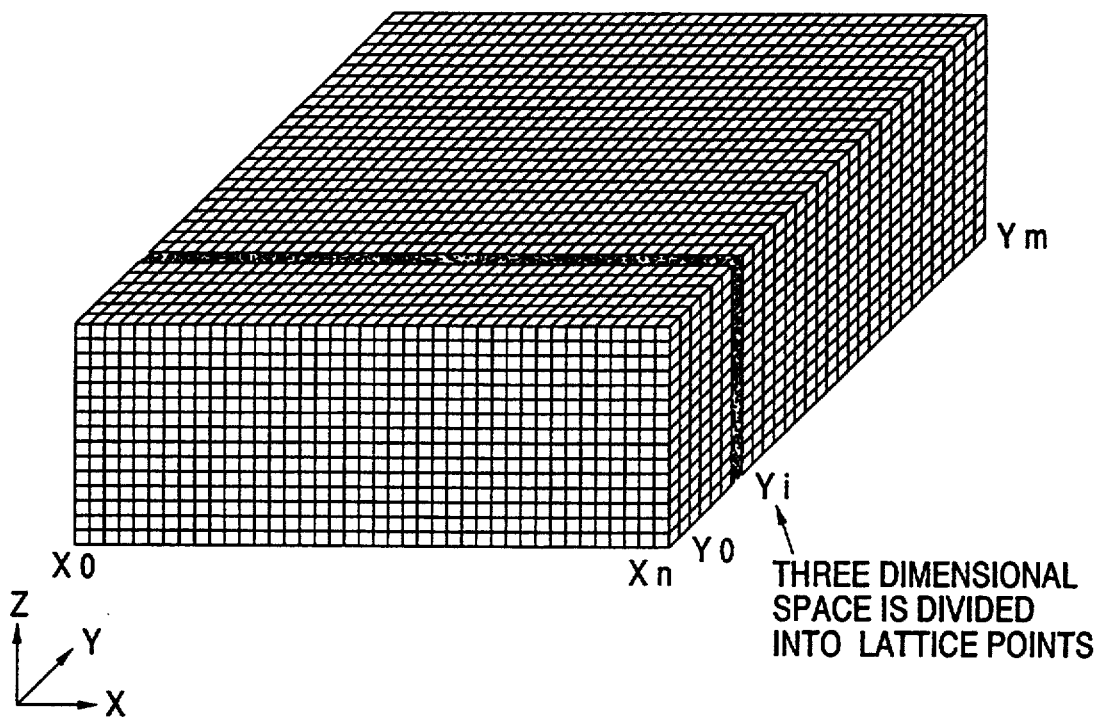
FIGS. 2A, 2B and 2C are views illustrating a second example of a conventional NC apparatus having a three-dimensional graphic display function.
Figure 2B:
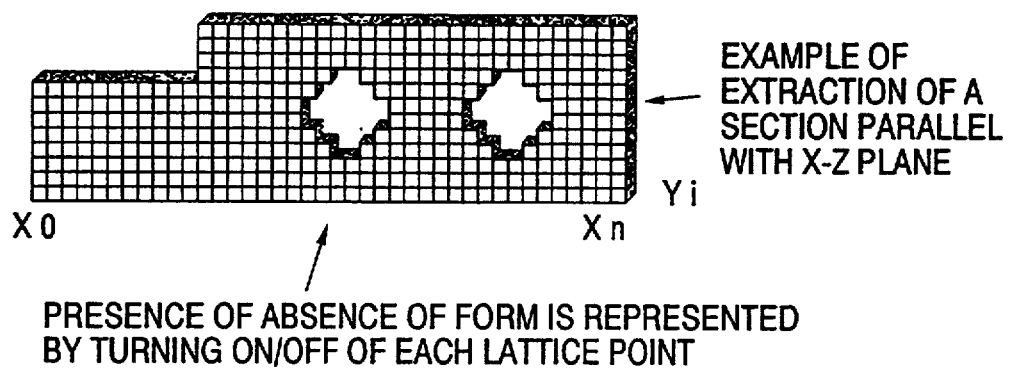
Figure 2C:
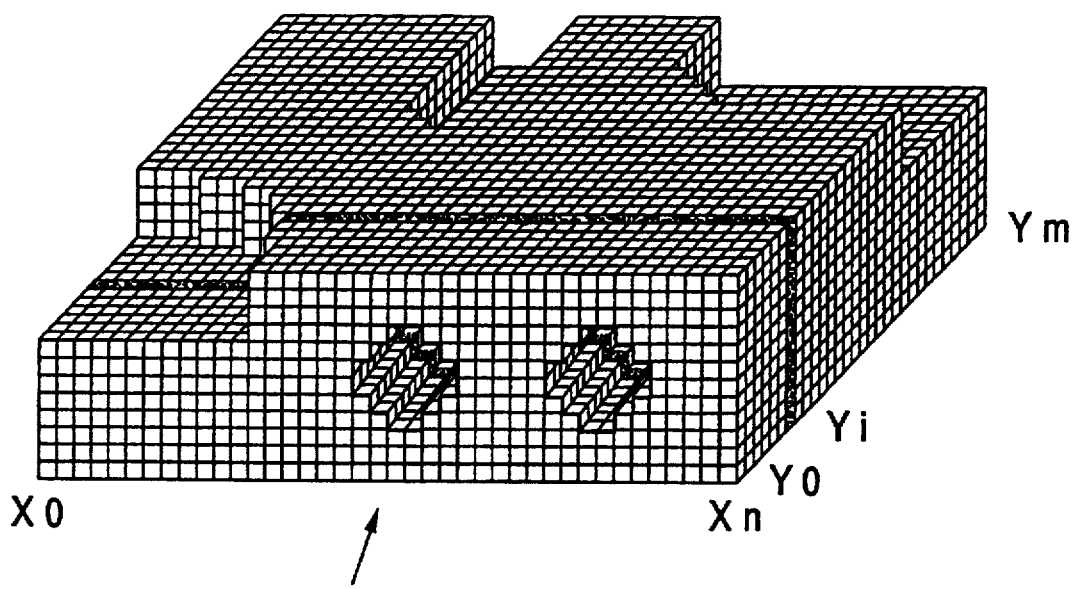
Figure 3:
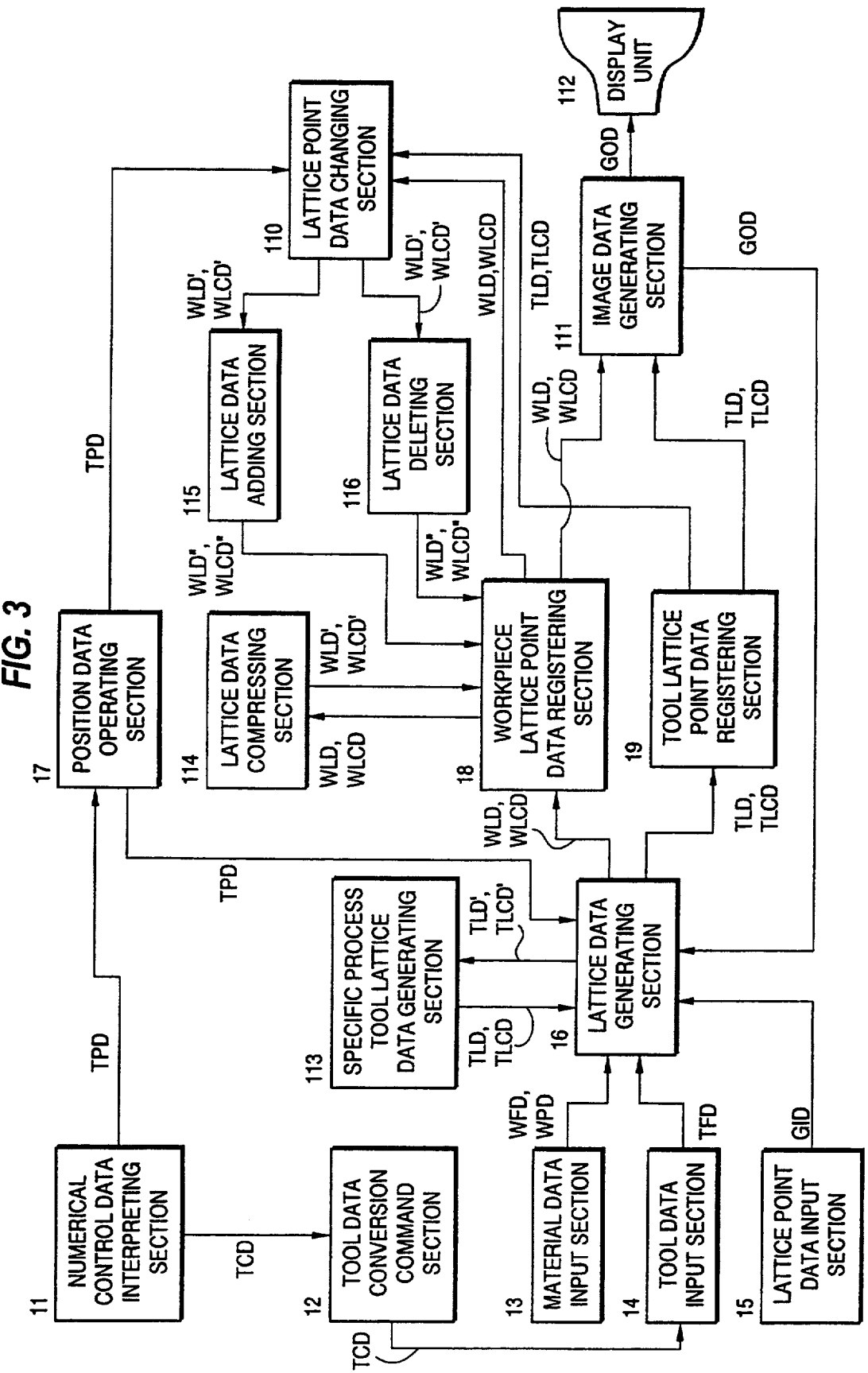
FIG. 3 is a block diagram showing an example of a numerical control apparatus having a three-dimensional graphic function of the present invention.
Figure 4:
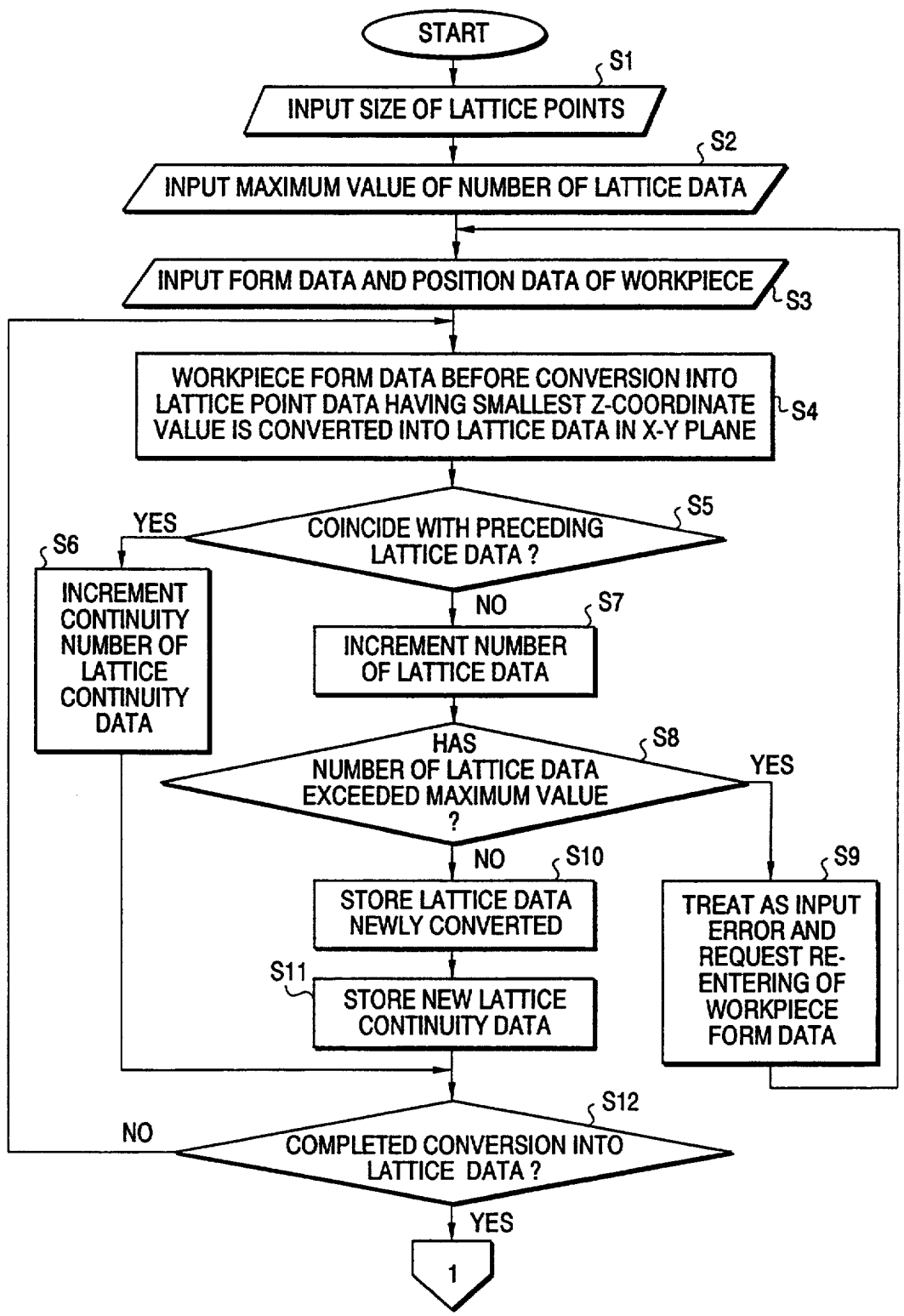
FIG. 4 is a flow chart illustrating an apparatus of the present invention.
Figure 5:
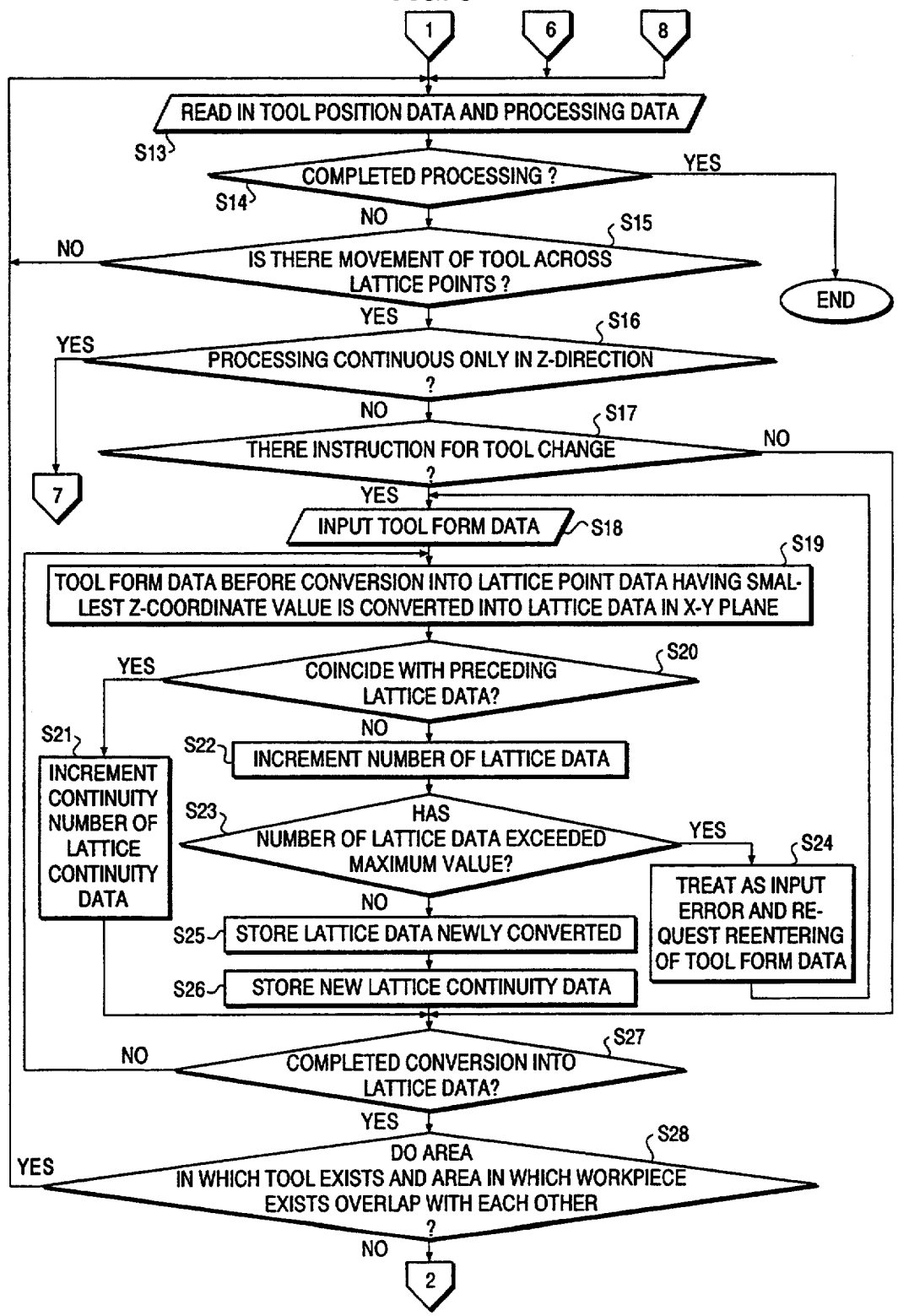
FIG. 5 is a segmentary view 1 of FIG. 4.

An example of a numerical control apparatus having a three-dimensional graphic function of the present invention will now be described with reference to the block diagram in FIG. 3 and the flow charts in FIGS. 4 to 8. The term "lattice data" used in the present embodiment refers to data which is a combination of the coordinate value of lattice points in the direction of one axis of the coordinate axes of a three-dimensional coordinate system and the binary data of each of lattice points on a plane including the remaining two axes corresponding to the coordinate values of the lattice points when a three-dimensional space is divided into the lattice points to represent the form data of a material and a tool based on the binary data for each lattice point. The term "lattice continuity data" refers to data constituted by the physical addresses indicating the memory locations in a memory area for the lattice data, continuity data indicating the number of identical lattice data which are continuous in the direction of the above-described axis, and link data indicating the memory locations for the lattice data at the next lattice point coordinate value on the lattice point coordinate in the direction of the above-described axis. Further, the term "preceding lattice data" and "succeeding lattice data" refer to lattice data which exist immediately before and after certain lattice data in link data.

First, the size of the lattice points and the maximum value of the lattice data for each of a material and a tool are input as lattice input data GID from a lattice point data input section 15 through direct input by an operator or the like (Step S1 and Step S2). Next, workpiece form data WFD and workpiece position data WPD are input from a workpiece data input section 13 (Step S3). Based on the lattice input data GID, workpiece form data WFD and the workpiece position data WPD, a lattice data generating section 16 converts the workpiece form data into lattice data and lattice continuity data. This is the contents of the Step S4 to the Step S12 which will be described in greater detail below.

The lattice data generating section 16 converts the workpiece form data of a plane parallel with the X-Y plane which has not gone through the conversion into lattice data and has the minimum Z-coordinate value into lattice data (Step S4). It is determined whether or not the converted lattice data coincides with the lattice data converted immediately before it (Step S5). If "yes", it is determined that the same lattice data continuously exist, and the process proceeds to the Step S12 after incrementing the continuity number in the lattice continuity data associated with the lattice data (Step S6). If it is determined at the Step S5 that there is no coincidence with the preceding lattice data, it is determined that new lattice data has appeared and the number of lattice data is incremented (Step S7). The number of the lattice data of a workpiece is counted within the system and is "0" at the point in time when the registration of workpiece form data is started.

Next, it is determined whether or not the number of these lattice data has exceeded the preset maximum value of the number of lattice data (Step S8). If "yes", the lattice data may be integrated at some portion as in the processes in the Steps S31 to S46 to be described later. In this case, however, a display warning of an input error and a display requesting the re-entering of the workpiece form data are shown (Step S9) and the process returns to the Step S3. If it is determined at the Step S8 that the number of the lattice data has not exceeded the maximum value, the workpiece lattice data WLD which has been converted most recently are registered in a workpiece lattice point data registering section 18.

Specifically, the workpiece lattice data WLD which has been converted most recently is stored in the physical address indicated by the link data in the lattice continuity data corresponding to the lattice data which have been converted and registered immediately before the current data (Step S10). The workpiece lattice continuity data WLCD corresponding to the lattice data to be currently registered is registered in the workpiece lattice point data registering section 18. Specifically, among areas for storing the lattice data for a workpiece, the physical address of the next vacant area following the area in which the lattice data currently registered is placed, is stored as the link data corresponding to the lattice data currently registered, and the continuity number is set to "1" (Step S11).

Figure 10:
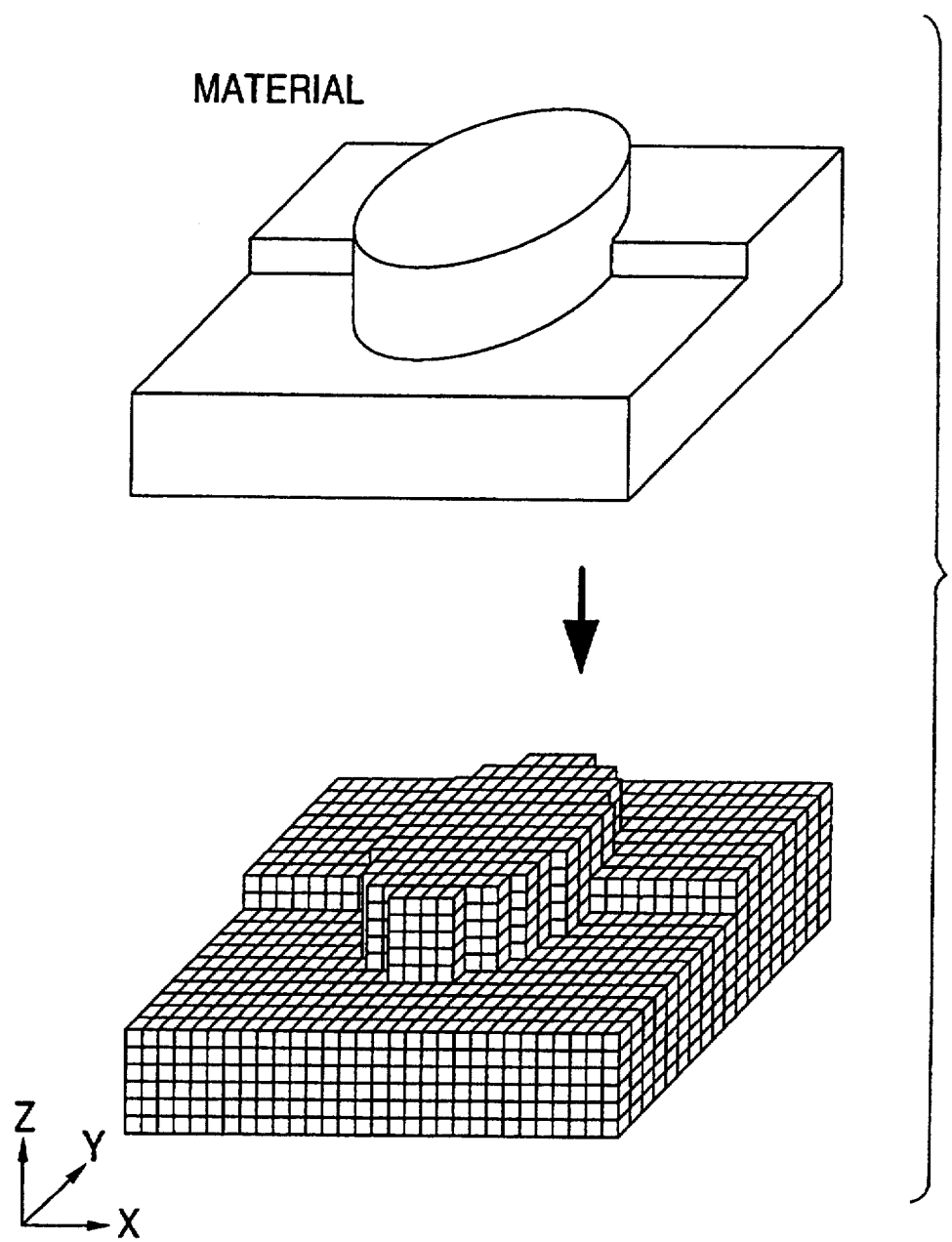
FIG. 10 is a perspective view showing an example of the development of form data into lattice data performed by the apparatus of the present invention.
Figures 11A, 11B:
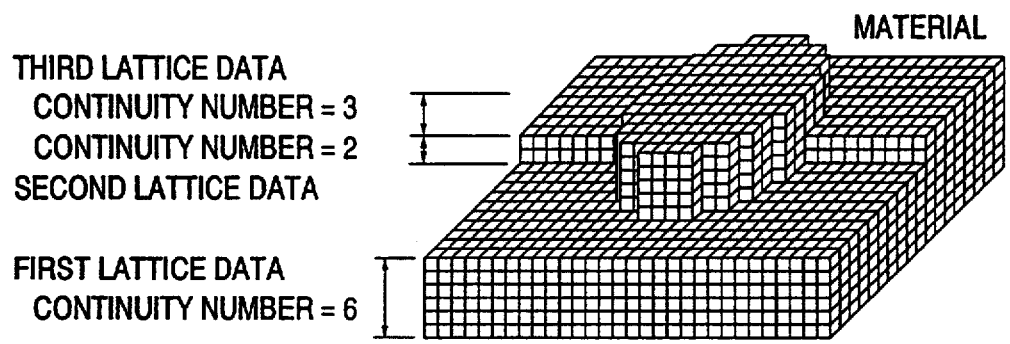
FIGS. 11A and 11B are views showing an example of a method of storing form data performed by the apparatus of the present invention.

Next, it is determined whether or not all the workpiece form data WFD have been converted into lattice data (Step S12). If "not", the process returns to the Step S4 since the workpiece form data for the next plane parallel with the X-Y plane must be converted into lattice data. Specifically, when workpiece form data as shown in FIG. 10 input from the material data input section 13 is converted into workpiece form data in accordance with lattice data, the algorithm as shown in the Steps S4 to S12 will result in memory contents, for example, as shown in FIGS. 11A and 11B.

Next, a numerical control data interpreting section 11 reads tool position data and processing data at a fixed timing (Step S13 in FIG. 5), transmits tool change data TCD to a tool data conversion command section 12 and the tool position data TPD to a position data operating section 17. Since the material may be in process in the subsequent steps, it will be referred to as "workpiece" instead of "material". The numerical control data interpreting section 11 determines whether or not the processing has been completed (Step S14) and, if "yes", it is determined by the position data operating section 17 whether or not the tool moves from its current position across one or more lattice points (Step S15). There will be no change in the lattice data if it does not move across one or more lattice points, so the process returns to the Step S13. If the tool moves across one or more lattice points, the position data operating section 17 further determines whether or not the processing (the direction in the which the tool moves) is continuous only in the Z-direction (Step S16). If the processing is continuous only in Z-direction, the Step S60 and later steps will be performed because it is a special process.

Steps S60 to S64 are performed by a specific process tool lattice data generating section 113. The specific process tool lattice data generating section 113 determines whether or not specific operations on the lattice continuity data as performed at the Steps S61 to S63 have already been performed (Step S60). If such specific operations have already been performed on the lattice continuity data, the process proceeds to the Step S64 because there is no need for performing the specific operations again. If the specific operations have not been performed, a logical-OR is obtained for the tool lattice data developed on a plane parallel with the X-Y plane through the processes performed by the Step S18 and later steps to be described later.

Next, the logical-OR obtained at the Step S61 is sequentially compared with lattice data starting with the lattice data corresponding to the Z-coordinate value closest to the direction in which the processing proceeds, and the first lattice data which coincides with the logical-OR is retrieved. In other words, the lattice data for the portion of the tool which is thickest when viewed in the Z-direction is retrieved (Step S62). Next, the lattice continuity data corresponding to the lattice data retrieved at the Step S62 is identified (Step S63). The continuity number data in the lattice continuity data thus identified is incremented by the number of the lattice points across which the movement at the current timing has taken place (Step S64).

Thus, the tool lattice data TLD and the lattice continuity data are changed.

Figure 12A:
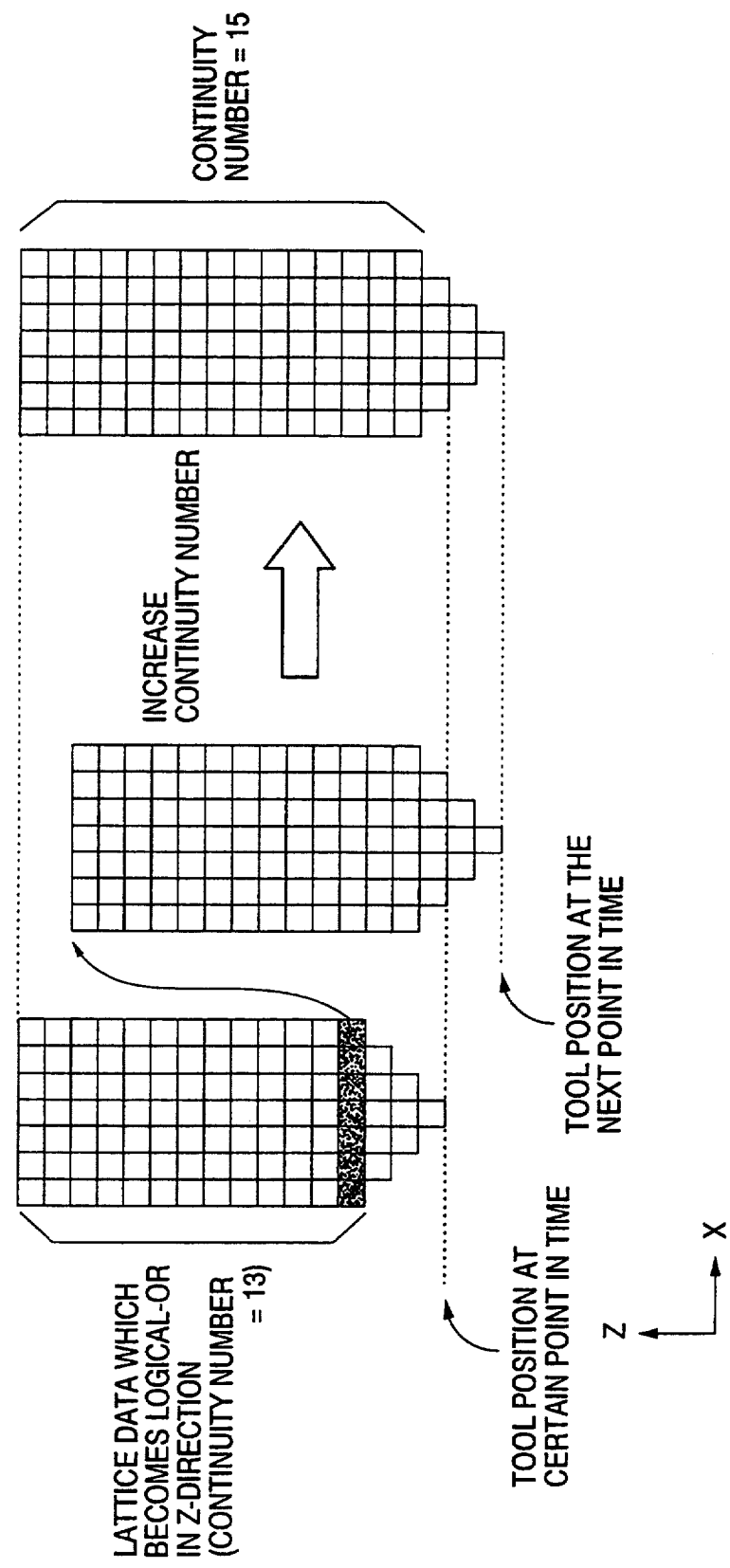
FIGS. 12A and 12B are views showing an example of a manner in which the apparatus of the present invention performs a logical-OR operation on form data of a tool.
Figure 12B:
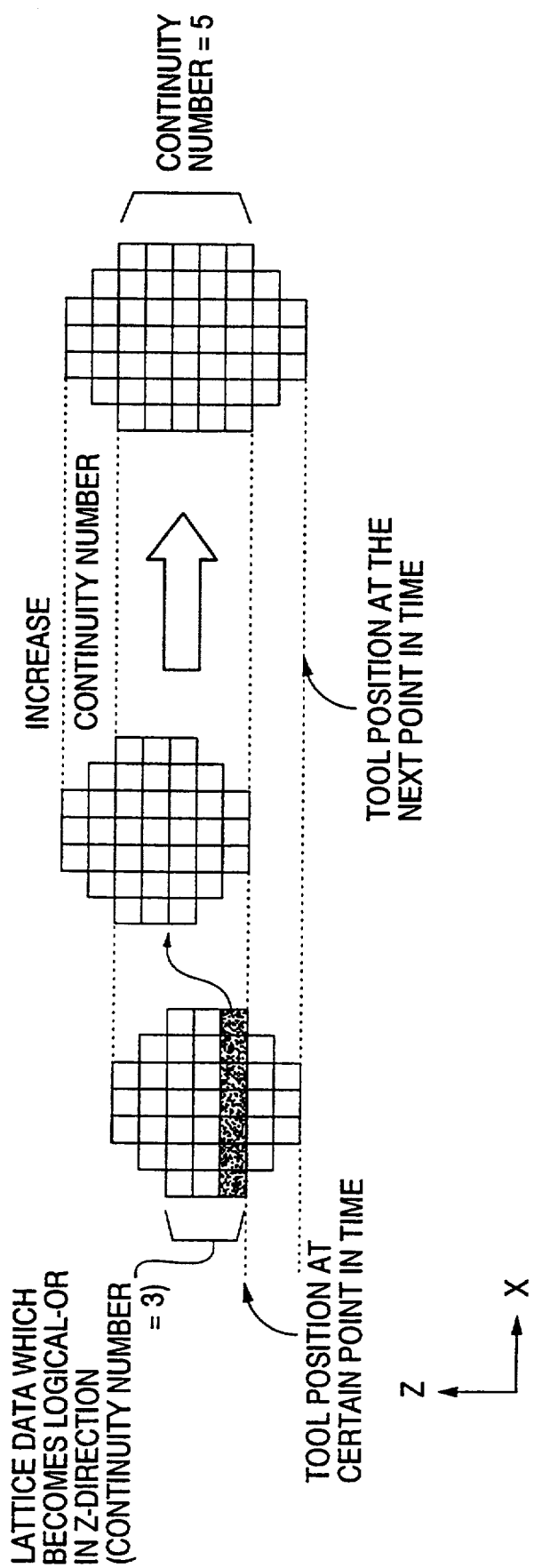

The above-described special processes at the Steps S60 to S64 are used as a means for preventing an excessive increase in lattice data having the same contents which otherwise occurs when the lattice data of a workpiece is manipulated each time drilling or the like is performed in the Z-direction. Specifically, the tool data is expanded in the Z-direction as shown in FIGS. 12A and 12B. In the present embodiment, it is assumed that the form of the tool is a rotating body and there invariably exists lattice data which can coincide with the logical-OR obtained at the Step S61. For a tool whose form can not be registered as a rotating body, the special processes at the Step S16 and the Steps S60 to S64 may be omitted.

The tool lattice data TLD and the tool lattice continuity data TLCD are thus changed. Next, if it is determined at the Step S16 in FIG. 5 that the processing is not continuous only in the Z-direction, it is monitored whether or not there has been an instruction to change the tool based on the tool change data TCD (Step S17). If "not", the process proceeds to the Step S28. If "yes", it is necessary to convert new tool form data into lattice data, so the tool form data TFD is input through the tool data input section 14 (Step S18).

Next, the lattice data generating section 16 converts the tool form data into lattice data based on the tool form data TFD and the tool position data TPD input from the position data operating section 17. This is the contents of the Steps S19 to S27 which will be described in detail below.

The lattice data generating section 16 converts the workpiece form data of a plane in parallel with the X-Y plane which has not gone through the conversion into lattice data and has the minimum Z-coordinate value into lattice data (Step S19). It is determined whether or not the converted lattice data coincides with the lattice data converted immediately before that (Step S20). If "yes", it is determined that the same lattice data continuously exist, and the process proceeds to the Step S27 after incrementing the continuity number in the lattice continuity data associated with the lattice data (Step S21). If it is determined at the Step S20 that there is no coincidence with the preceding lattice data, it is determined that new lattice data has appeared and the number of lattice data is incremented by one (Step S22).

The number of the lattice data of a workpiece is counted within the system and is "0" at the point in time when the registration of workpiece form data is started.

Next, it is determined whether or not the number of the lattice data has exceeded the preset maximum value of the number of lattice data (Step S23). If so, the lattice data may be integrated at some portion as in the processes in the Step S31 to S46 to be described later. In this case, however, a display warning of an input error and a display requesting the re-entering of the workpiece form data are shown on a display unit 112 (Step S24) and the process returns to the Step S18.

If it is determined at the Step S23 that the number of the lattice data has not exceeded the maximum value, the tool lattice data TLD which has been converted most recently is registered in a tool lattice point data registering section 19. Specifically, the tool lattice data TLD which has been converted most recently is stored in the physical address indicated by the link data in the lattice continuity data corresponding to the lattice data which has been converted and registered immediately before the current one (Step S25). The tool lattice continuity data TLCD corresponding to the lattice data to be currently registered is registered in the tool lattice point data registering section 19. Specifically, among areas for storing the lattice data for a tool, the physical address of the next vacant area following the area in which the lattice data currently registered is placed, it stored as the link data corresponding to the lattice data currently registered, and the continuity number is set to "1" (Step S26).

Next, it is determined whether or not all the tool form data TFD have been converted into lattice data (Step S27). If "yes", the process proceeds to the Step S28. If "not", the process returns to the Step S19 since the tool form data for the next plane parallel with the X-Y plane must be converted into lattice data.

The conversion of tool form data into lattice data as described above is the same as that for a workpiece shown in FIGS. 11A and 11B.

In a lattice point data changing section 110, the maximum and minimum values of the workpiece and the tool in X-, Y- and Z-directions are obtained based on the workpiece lattice data WLD and the tool lattice data TLD which have been registered. The rectangular parallelpiped areas surrounded by the maximum and minimum values are defined as areas in which the workpieces and the tool exist, and it is determined whether or not the area in which the workpiece exists and the area in which the tool exists interfere with each other (Step S28). If "yes", there may be a process in progress, so the Step S29 and later steps will be performed. If "not", there is no possibility that the processing will be performed causing the workpiece lattice data WLD and the workpiece lattice continuity data WLCD to be changed, so the process returns to the Step S13.

Figure 13:
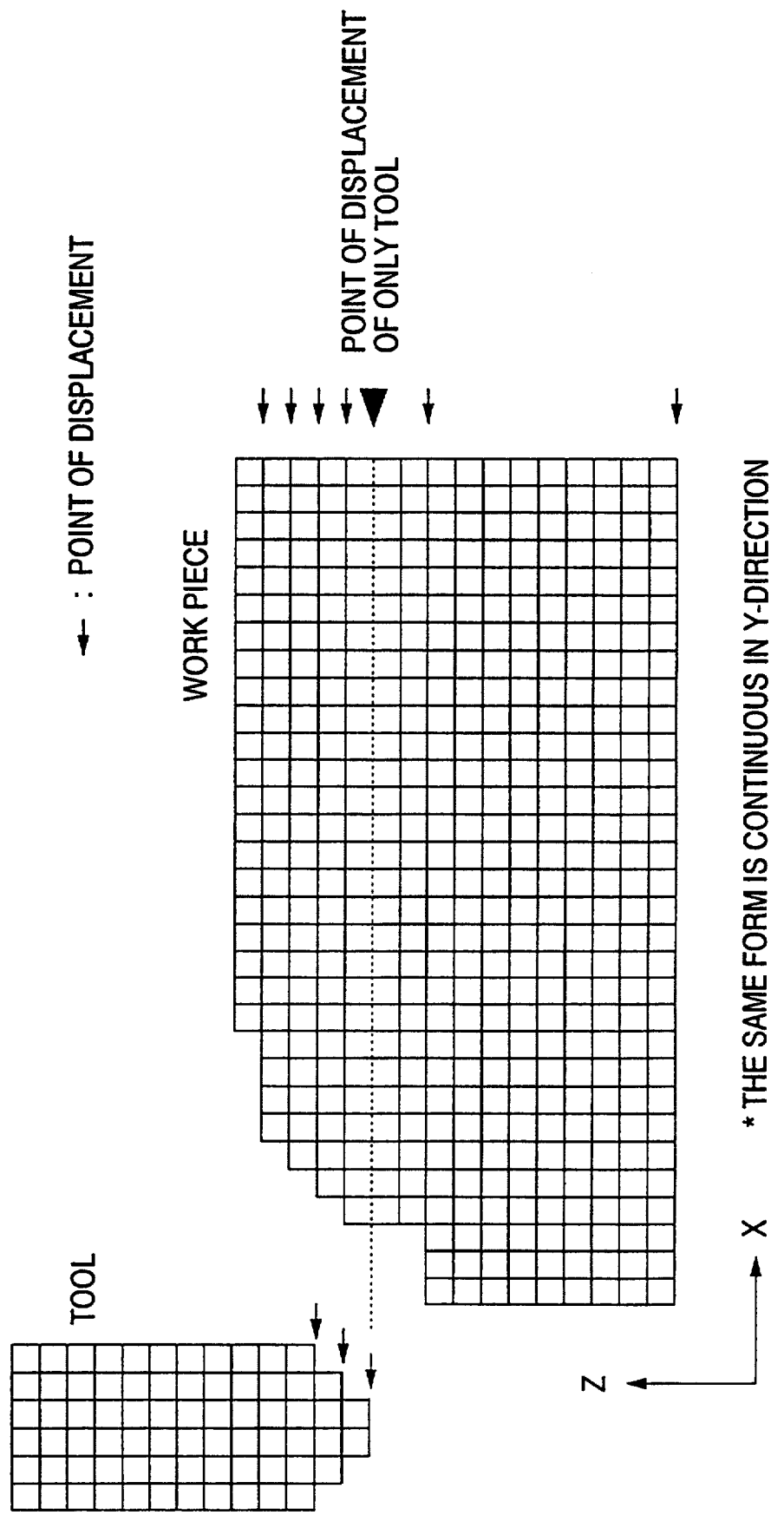
FIG. 13 is a view showing an example of a manner in which the apparatus of the present invention obtains points of displacement in lattice data.

The lattice data changing section 110 counts the number of areas wherein no displacement in the tool lattice data and hence no displacement in the workpiece lattice data has occurred among areas wherein the tool and the workpiece overlap with each other in the Z-direction as shown in FIG. 10 (Step S29). It is to be noted that the ends of the tool and the workpiece in the Z-direction are also counted as the areas of displacement. For example, there is only one point in which only the lattice data for the tool has been displaced in the case as shown in FIG. 13.

Next, it is determined whether or not the value obtained by adding the count value to the number of the current workpiece lattice data exceeds the preset maximum value of the number of lattice data (Step S30). If "not", the maximum value will not be exceeded even if the amount of the lattice data increased as a result of processing is taken into consideration, and it is not necessary to reduce the number of the lattice data which currently exist. Therefore, it is determined to be appropriate to perform the process at a lattice data adding section 115 and the Step S47 is entered. If "yes", it is first determined to be necessary to perform the process at a lattice data deleting section 116, and a loop counter N for reducing the number of workpiece lattice data is set to the number by which the number of the current workpiece lattice data added with the count value exceeds the maximum value of the lattice data.

Figure 6:
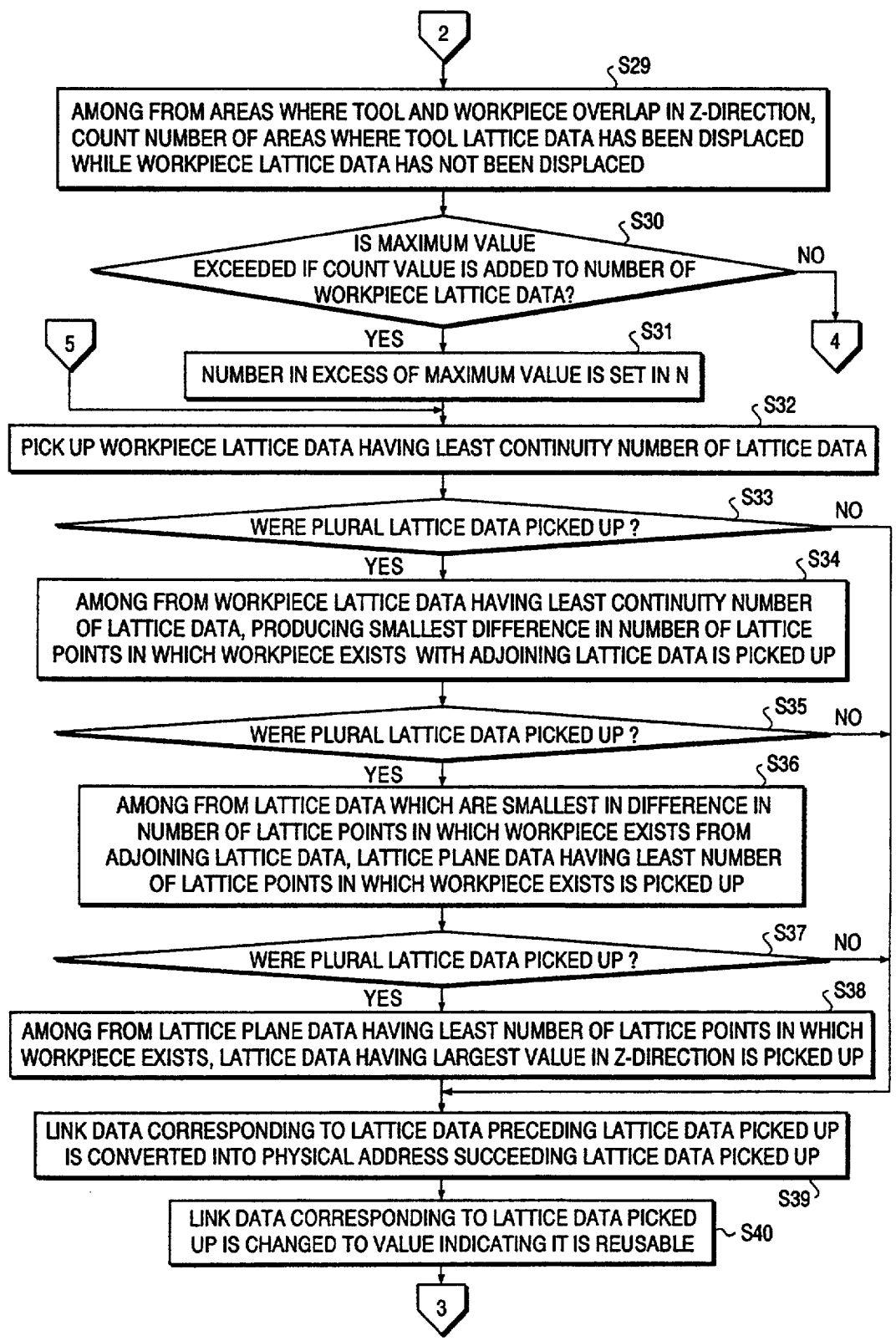
FIG. 6 is a segmentary view 2 of FIG. 4.
Figure 7:
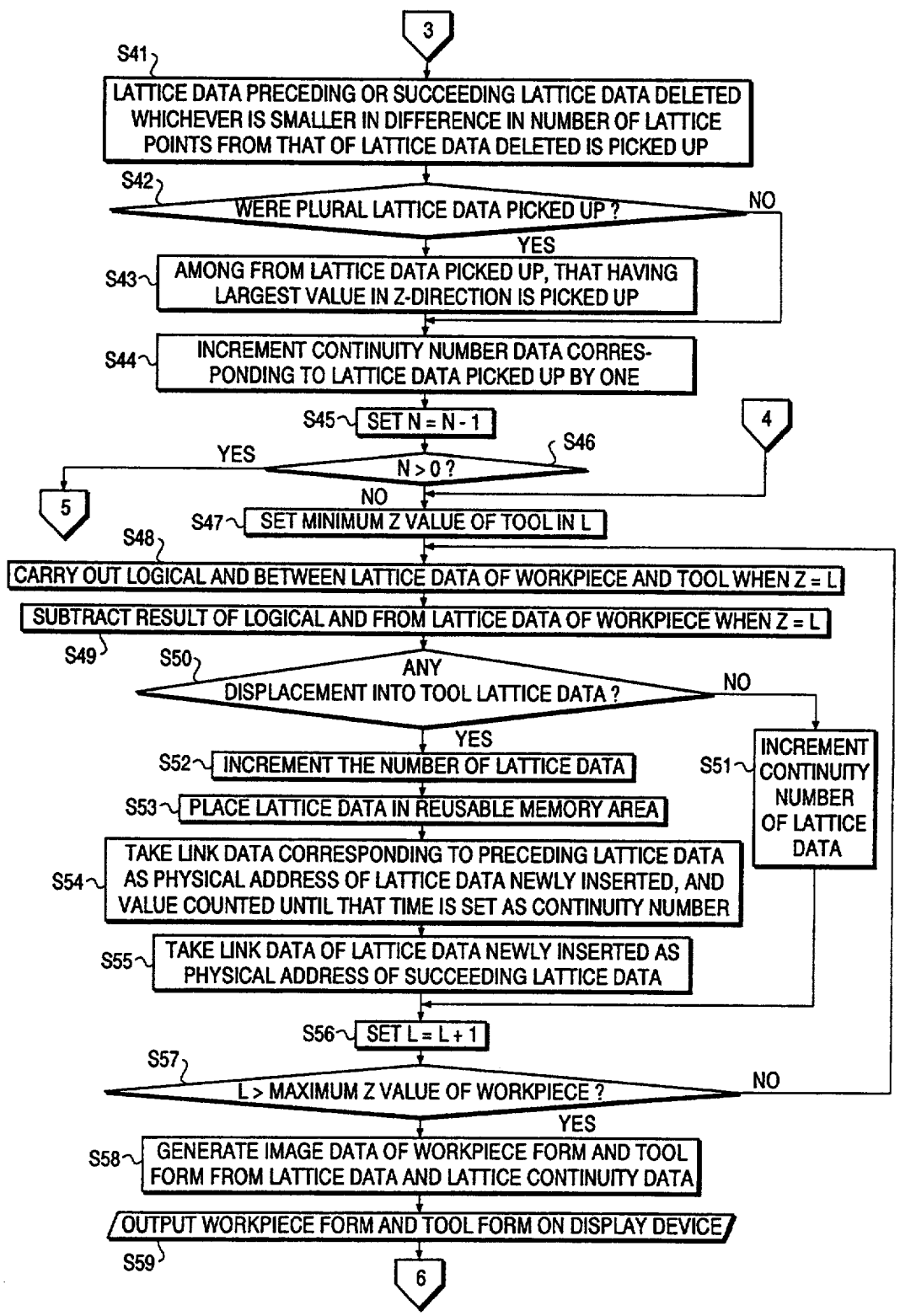
FIG. 7 is a segmentary view 3 of FIG. 4.
Figure 8:
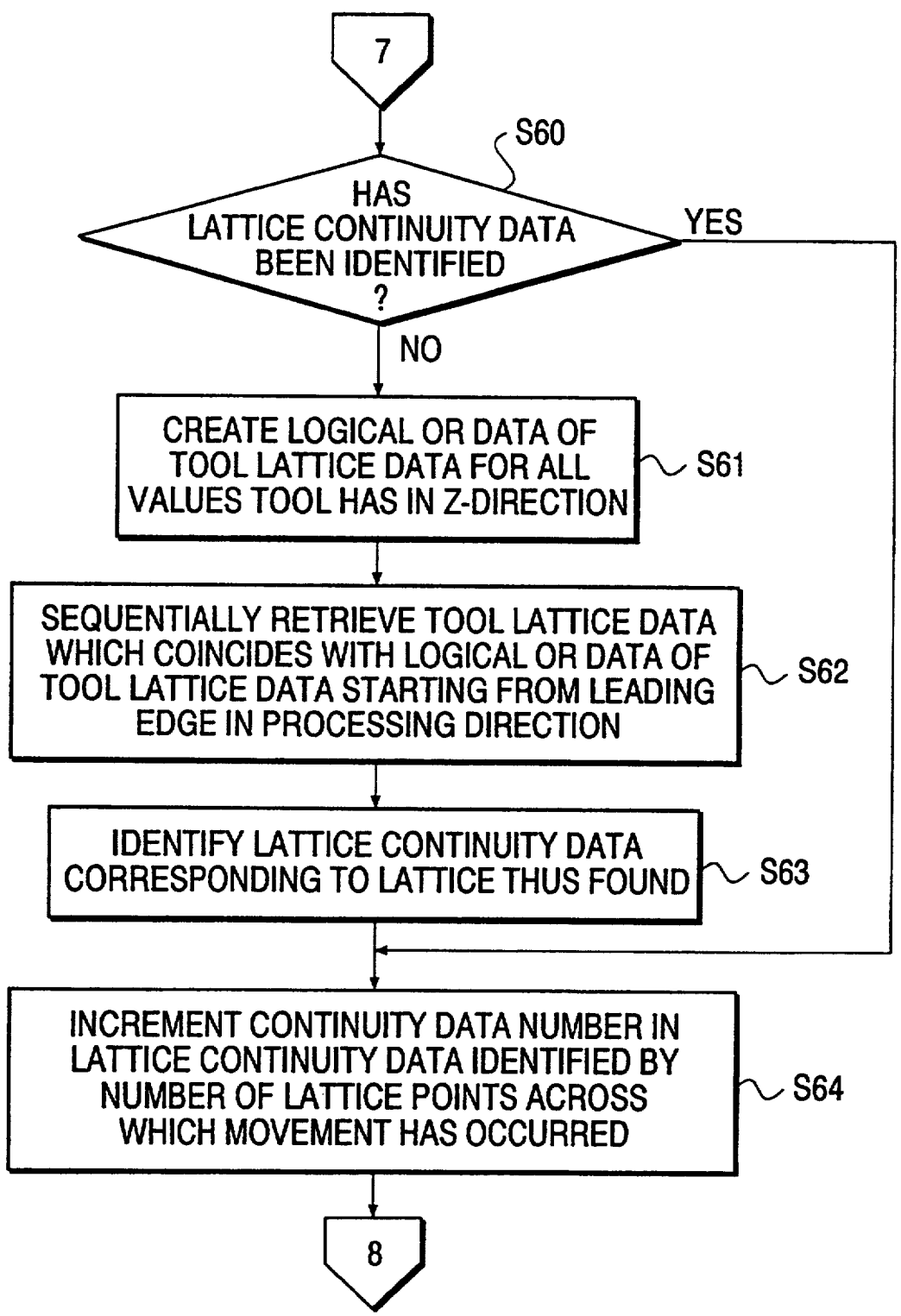
FIG. 8 is a segmentary view 4 of FIG. 4.

The Steps from S31 in FIG. 6 to the Step S48 in FIG. 7 are all performed by the lattice data deleting section 116.

Next, the lattice data corresponding to the lattice continuity data whose continuity number is the smallest among the workpiece lattice continuity data is picked up (Step S32), and it is determined whether the lattice data thus picked up is plural or singular (Step S33). If a single piece of lattice data has been picked up, the lattice data can be regarded as the lattice data to be deleted, so the process proceeds to the Step S39. If plural pieces of lattice data have been picked up, in order to further narrow down the lattice data to be deleted, the difference between the numbers of lattice points wherein the workpiece exists in the lattice data thus picked up and the lattice data located in the row directly above the lattice data picked up and the difference between the numbers of lattice points wherein the workpiece exists in the lattice data thus picked up and the lattice data located in the row directly below the lattice data picked up are obtained for all the lattice data picked up, and the lattice data which produces the smallest difference is picked up (Step S34).

Then, it is determined whether the lattice data thus picked up is plural or singular (Step S35). If a single piece of lattice data has been picked up, the lattice data can be regarded as the lattice data to be deleted, so the process proceeds to the Step S39. If plural pieces of lattice data have been picked up, in order to further narrow down the lattice data to be deleted, the lattice data having the least number of lattice points is picked up among from those lattice data thus picked up (Step S37). It is determined whether the lattice data thus picked up is plural or singular (Step S36). If a single piece of lattice data has been picked up, it can be regarded as the lattice data to be deleted, so the process proceeds to the Step S39.

If plural pieces of data have been picked up, in order to further narrow down the lattice data to be deleted, the lattice data having the largest value in the Z-direction is picked up among from the lattice data thus picked up (Step S38). Then, the link data corresponding to the lattice data preceding the lattice data picked up is changed to the physical address of the lattice data succeeding the lattice data picked up. In other words, the lattice data picked up is deleted (Step S39). Then, the link data for the lattice data picked up is changed to a value indicating that it is re-usable so that an increase in the lattice data resulting from processing can be accommodated (Step S40). The workpiece lattice data WLD' changed in the Steps S39 and S40 are re-registered in the workpiece lattice point data registering section 18.

Next, the lattice data immediately before or after the lattice data thus deleted whichever is smaller in difference in the number of lattice points from that of the lattice data thus deleted is picked up (Step S41). It is determined whether the lattice data thus picked up is plural or singular (Step S42). If a single piece of lattice data has been picked up, the lattice data can be regarded as the lattice data to be deleted, so the process proceeds to the Step S44. If plural pieces of data have been picked up, in order to further narrow down the lattice data to be deleted, the lattice data having the largest value in the Z-direction is picked up among from the lattice data thus picked up (Step S43). Then, the continuity number data in the lattice continuity data corresponding to the lattice data thus picked up is incremented by one (Step S44).

The lattice continuity data WLCD' changed at the Step S44 is re-registered in the workpiece lattice point data registering portion 18. Since one piece of lattice data in the excess of the maximum value has been deleted, the loop counter N is decremented by one (Step S45) and it is determined whether or not the value in the loop counter N is greater than zero (step S46). As long as the value in the loop counter N is greater than zero, there exists lattice data to be deleted, so the process returns to the Step S32. If the value in the loop counter N is equal to or less than zero, there is no lattice data to be deleted, so the process proceeds to the Step S47.

Figure 14A:
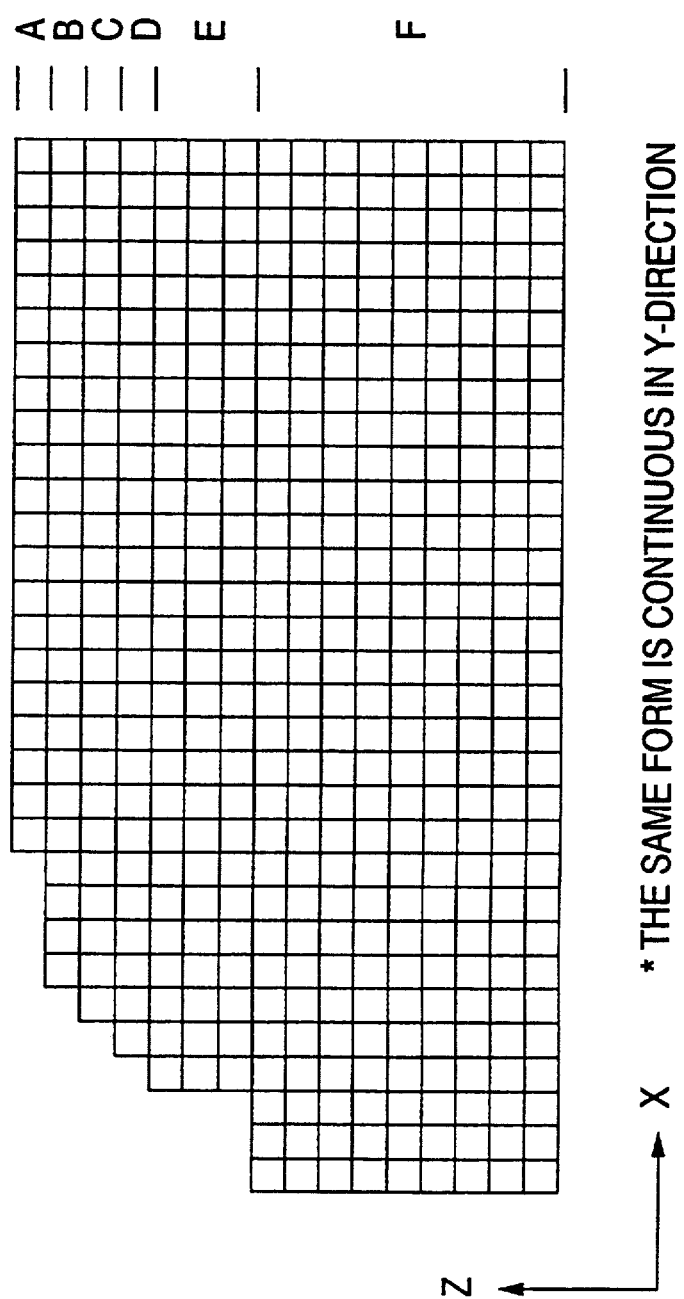
FIGS. 14A and 14B are views showing an example of a manner in which the apparatus of the present invention deletes lattice data.

The Steps S30 to S46 terminate the deletion of the lattice data to be deleted while keeping changes to the form of the workpiece to a minimum. The lattice data deleting section 116 also changes lattice continuity data in accordance with the deletion of lattice data. For example, when a workpiece as shown in FIG. 14A is present and the number of lattice data must be decremented by one, "A", "B", "C" and "D" are picked up at the Step S32 (the picking up of the lattice data corresponding to the lattice continuity data whose continuity number is the smallest among those in the lattice continuity data of the workpiece).

Figure 14B:
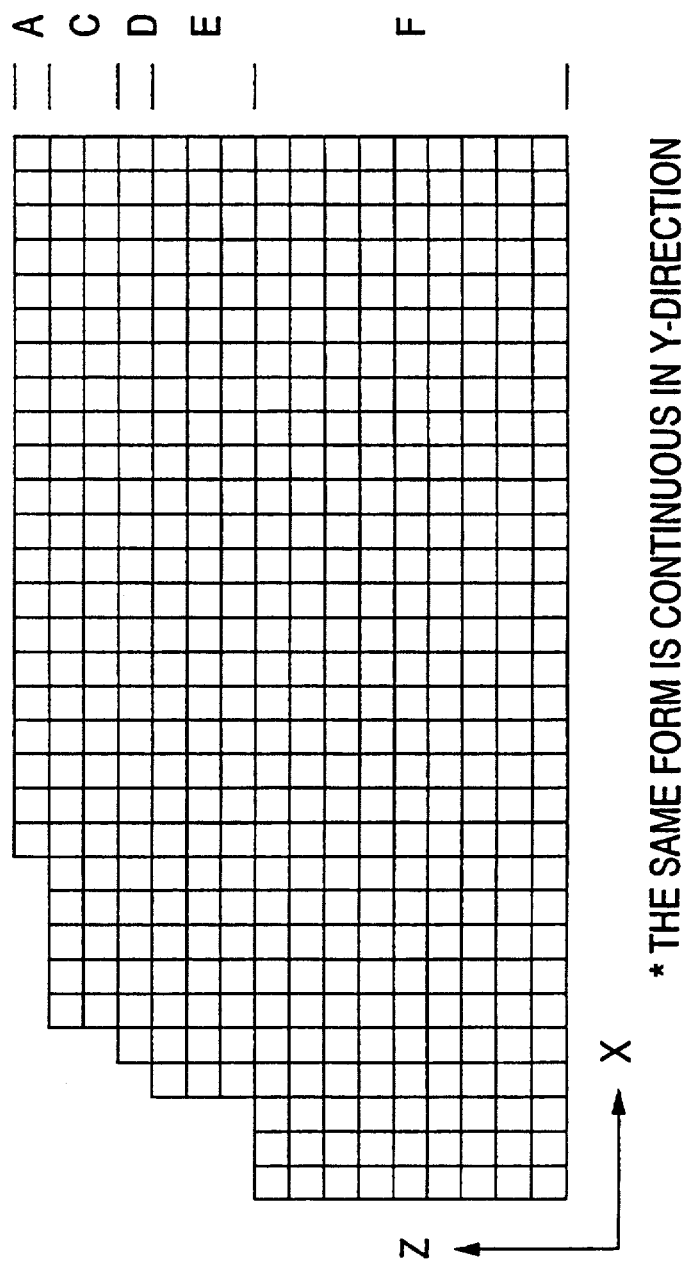

At the Step S34 (the picking up of the lattice data which is the smallest in difference in the number of lattice points in which the workpiece exists from respective lattice data located above and below it), "B", "C" and "D" are picked up. Further, at the Step S36 (the picking up of the lattice data having the smallest number of lattice points among from the lattice data picked up). "B" is picked up and this terminates the picking up of the lattice data to be deleted. Then, the Steps S41 to S44 increment the continuity number of "C" by one as shown in FIG. 14B. At this, point, the continuity data and the link data are changed as shown in FIGS. 15A and 15B.

When there is no lattice data to be deleted, the minimum Z-value for the tool is set in a loop counter L for generating the form of the workpiece after the processing (Step S47).

The Steps S47 to S57 in FIG. 7 are all performed by the lattice data adding section 115.

In order to extract the areas wherein the tool and the workpiece interfere with each other, a logical-AND is carried out between the lattice data of the workpiece and the tool when Z=L (Step S58), and the area wherein the tool and the workpiece interfere width each other is subtracted from the form of the workpiece to generate the form of the workpiece after processing (Step S49). Next, it is determined whether or not there is any displacement in the lattice data of the tool when Z=L (Step S50). If "yes", there may be a change also in the lattice data of the workpiece processed with the tool, so the process proceeds to the Step S52 and later steps to register new lattice data.

If there is no displacement, the same workpiece lattice data continuously appear after the processing, so the continuity number of the workpiece lattice data is incremented. The lattice data which have already been registered also undergo changes with regard to the areas wherein the processing has been performed. Therefore, the continuity number is incremented again (Step S51), and the process proceeds to the Step S56 and later steps. If it is determined at the Step S50 that there is displacement in the lattice data of the tool when Z=L, new lattice data is to be registered. So, the number of the lattice data is incremented (Step S52), and new lattice data is placed in a re-usable memory area (Step S53).

Then, the link data corresponding to the preceding lattice data is taken as the physical address wherein the new lattice data is stored and the continuity number data in the lattice data corresponding to the preceding lattice data is taken as the value which has been counted until then (Step S54). Further, the link data corresponding to the new lattice data is taken as the physical address of the succeeding lattice data (Step S55).

The above-described Steps S52 to S55 perform the insertion of the new lattice data associated with the processing.

Since the generation of the form of the workpiece after the processing when Z=L has been completed, the loop counter L is added with one (Step S56), and it is determined whether or not the value in the loop counter L is greater than the maximum Z-value of the workpiece (Step S57). If "yes", the generation of the form of the workpiece after the processing when Z=L has been completed, so the process proceeds to the Step S58 and later steps. If it is equal to or smaller than the maximum value, the process returns to the Step S48 to generate the form of the workpiece at the next Z-value.

The lattice data adding section 115 also performs the changing of the lattice data associated with the addition of the lattice data.

Figure 16A:
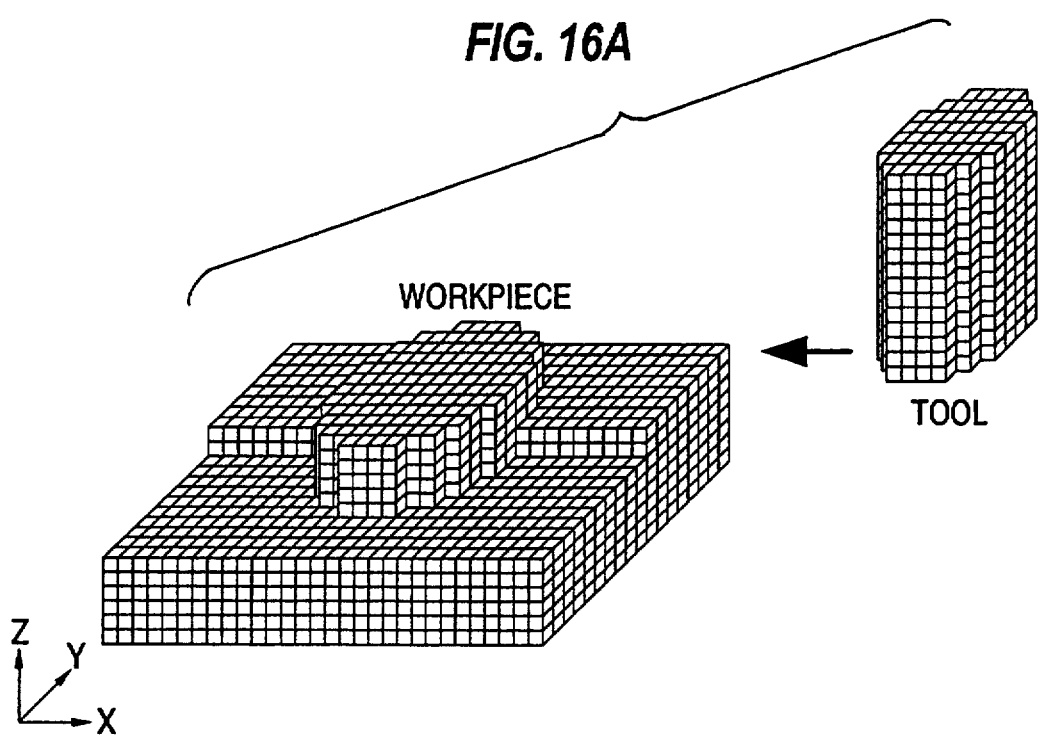
FIGS. 16A, 16B and 16C are views showing an example of the addition of lattice data performed by the apparatus of the present invention.
Figure 16B:
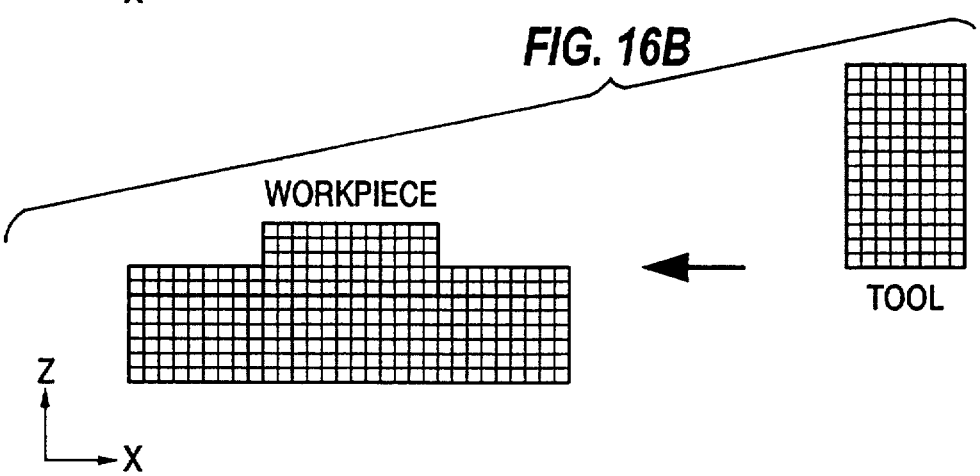
Figure 16C:
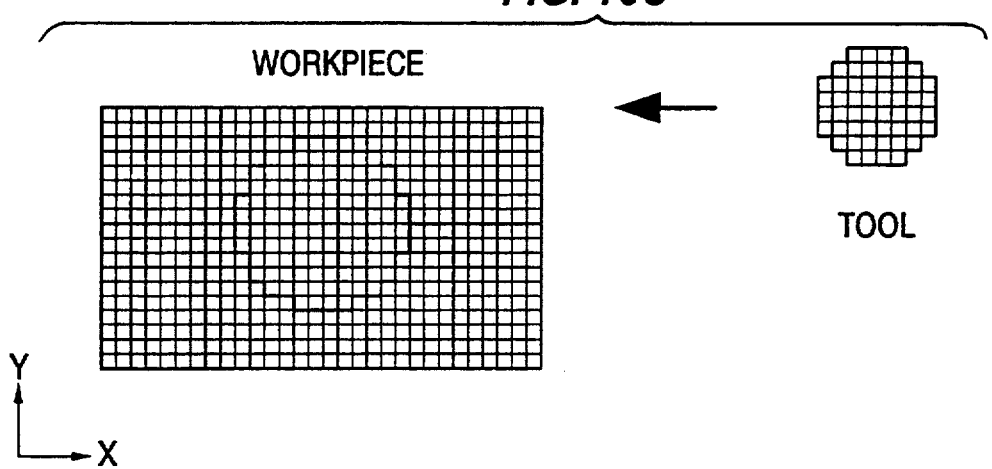

When the process as shown in FIGS. 16A to 16C are performed on the form as shown in FIGS. 11A and 11B, the lattice data in the middle of the process is as shown in FIG. 17. As seen in the figure, even if the lattice data which exists in the middle is processed in the Z-coordinate, there is no influence on other lattice data. It is therefore possible to perform processing in any direction.

Next, an image data generating section 111 generates image data GOD of the forms of the workpiece and the tool in accordance with the workpiece lattice data WLD and the workpiece lattice continuity data WOCD obtained from the workpiece lattice point data registering section 18 and the tool lattice data TLD and the tool lattice continuity data TLCD obtained from the tool lattice point data registering section 19 (Step S58). The image data GOD is output on the display unit 112 (Step S59). The process then returns to the Step S13 in FIG. 5 and, if it is determined that the processing has been completed at the Step S14, the entire process is terminated.

The present embodiment shows an algorithm wherein tool form data are read each time a tool change is requested in processing data. However, the tool form data may be collectively read in advance. Further, the logical-OR may be carried out for a certain period of time on the lattice data of a tool which is moving. The logical-OR may be replaced with the tool lattice data and may be deleted from the work lattice data to leave the form data of the workpiece after the processing. Although the criteria as in the Steps S32, S34, S36 and S38 are used for picking up the lattice data to be deleted, they may be used partially.

Figure 9:
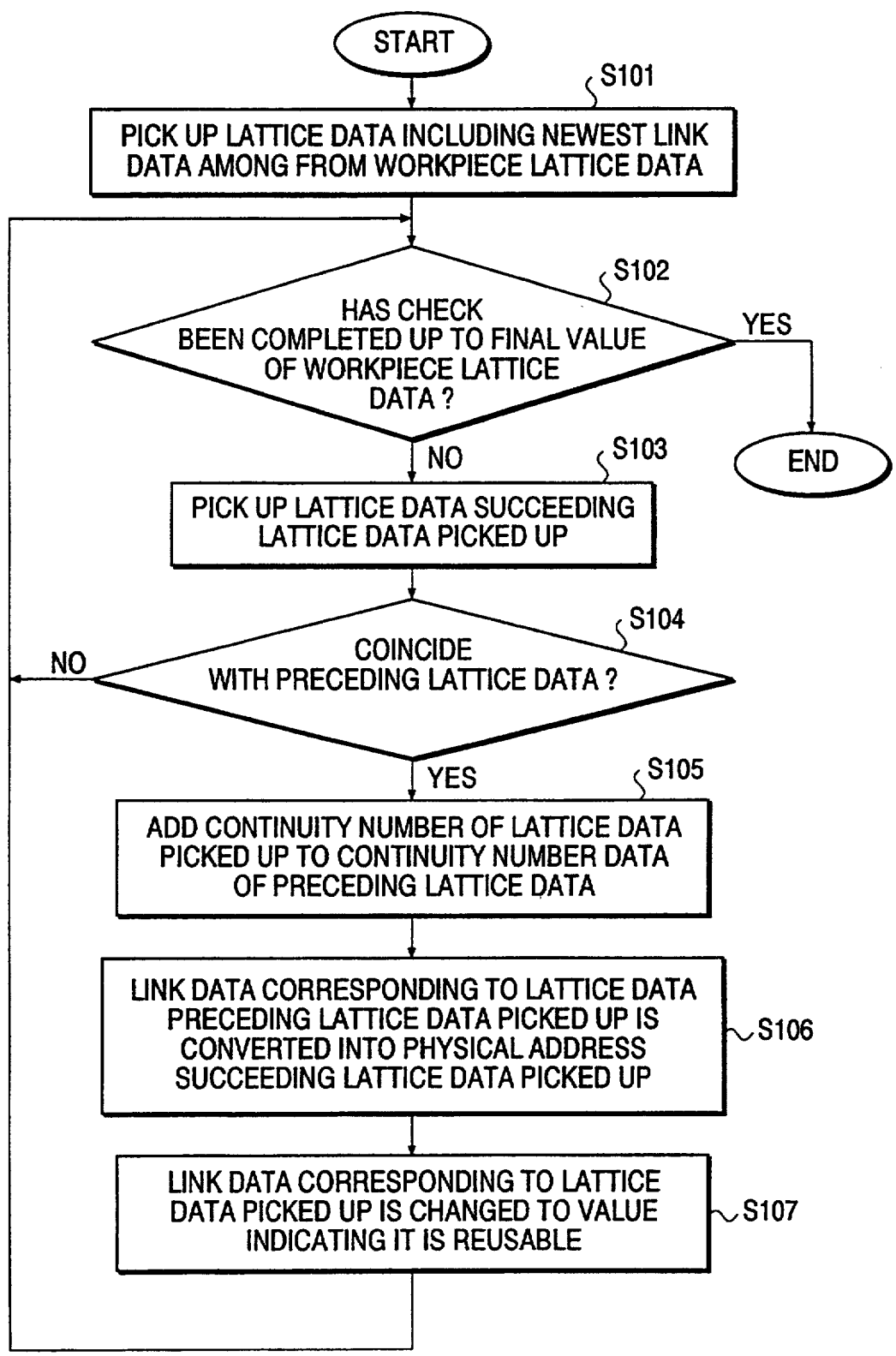
FIG. 9 is a flow chart illustrating an example of the method of the compression of form data performed by the apparatus of the present invention.

The processing as described above may reduce the utilization of the memory due to the same lattice data that are adjoining each other. This problem can be avoided by compressing the workpiece form data at a certain timing, e.g., each time a process step is performed. An example of this compression method will now be described with reference to the flow chart in FIG. 9.

A lattice data compressing section 114 performs the Steps S101 to S107 as follows. The lattice data having the newest link data is picked up among from the workpiece lattice data WLD (Step S101). Next, it is determined whether or not the workpiece lattice data has been checked up to the final value thereof (Step S102), if the check has been completed, the process is terminated.

If the check has not been completed, there is a possibility that the compression of the workpiece data may be performed. So the lattice data which is present immediately after the lattice data picked up so far is picked up (Step S103). It is determined whether or not this new lattice data picked up coincides with the preceding data (Step S104). If "not", there is no possibility that the lattice data newly picked up will be compressed, so the process returns to the Step S102 to pick up the next lattice data. If they coincide, the compression of the workpiece lattice data may be performed, so the continuity data in the lattice continuity data corresponding to the lattice data preceding the lattice data newly picked up is added with the continuity number corresponding to the lattice data newly picked up (Step S105).

Then, the link data corresponding to the lattice data preceding the lattice data newly picked up is changed to the physical address of the lattice data which is present immediately after the lattice data newly picked up (Step S106). Further, the link data of the lattice data newly picked up is changed to a value indicating that it is re-usable. In other words, the link data is changed so that an increase in the lattice data due to the processing can be accommodated (Step S107).

The above-described Steps S105 to S107 perform the compression of the workpiece lattice data. As a result, WLD' and WLCD' are re-registered in the workpiece lattice point data registering section 18. Thus, the processing at the Steps S101 to S107 completes the compression of the workpiece lattice data.

Figure 18A:
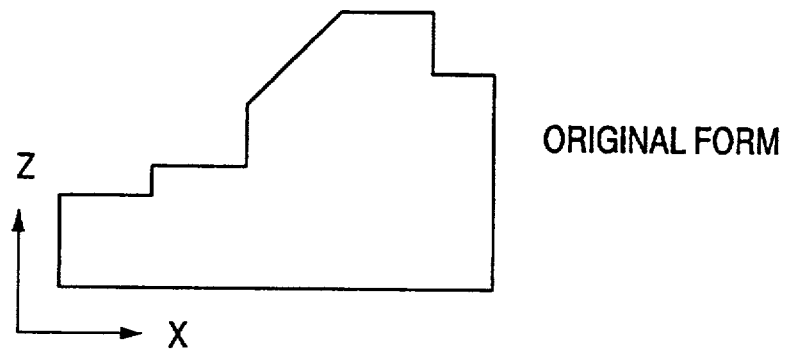
FIGS. 18A and 18B are views showing an example wherein the accuracy of display is improved by the apparatus of the present invention.
Figure 18B:
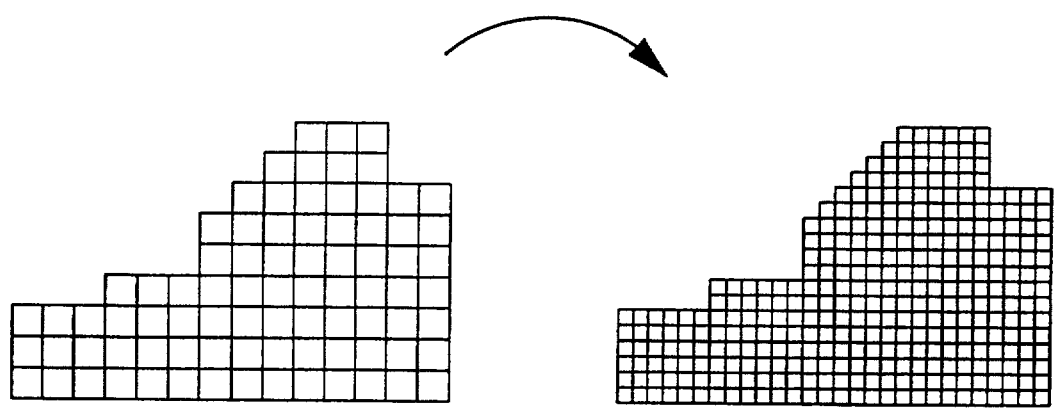

When the accuracy of lattice points is doubled, the number of lattice data is of course doubled in the prior art. On the other hand, in the method of the inventive section, the number of lattice data in the Z-direction is not so much increased as to be doubled as shown in FIGS. 18A and 18B. Therefore, the memory capacity will not increase in proportion to the degree to which the accuracy of display is improved.

As described above, with an NC section having a three-dimensional graphic display function of the present invention, it is possible to perform display in a manner appropriate not only for processing from the upper surface of a workpiece but also for any kind of processing such as drilling on a side of a workpiece; the form data for a workpiece and a tool can be stored using smaller memory capacity; and the accuracy of display can be improved for areas wherein the accuracy must be improved without increasing the memory capacity.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A numerical control apparatus having a three-dimensional graphic display function comprising:
   a first input means for inputting workpiece form data denoting a form of a workpiece in a three-dimensional coordinate system,
   a second input means for inputting tool form data denoting a form of a tool in a three-dimensional coordinate system,
   a lattice data generating means for converting the workpiece form data and the tool form data input by said first and second input means into binary data of lattice points in a preset size on the three-dimensional coordinate system, generating lattice data by combining a lattice point coordinate value in the direction of one of the coordinate axes of said three-dimensional coordinate with a corresponding lattice point binary data indicative of a location of a corresponding lattice point on a plane including the remaining two axes, and generating, as lattice continuity data, a physical address indicating a memory location of said lattice data in a memory area and link data indicating the memory location of the lattice data for the lattice coordinate value following said lattice data among lattice point coordinate values in the direction of said axis,
   a lattice data changing means for changing the contents of the lattice data of said workpiece by obtaining the areas in which the lattice data of said workpiece and the lattice data of said tool interfere with each other through numerical operations and by subtracting said areas of interference from the lattice data of the workpiece,
   a lattice data adding means for adding new lattice data to a memory area available in the existing memory areas for the lattice data of the workpiece when the lattice data for the workpiece has not been displaced relative to prior lattice data for the workpiece in the position in the lattice coordinate values in the direction of said axis in which the lattice data of the tool has displaced and for changing said link data in accordance with the addition,
   a lattice continuity data changing means for changing said lattice continuity data in accordance with the change in the lattice data of the workpiece, and
   a display means for generating image data based on said lattice data and lattice continuity data of the workpiece and the tool and for displaying the forms of the workpiece and the form of the tool on a graphic display device.

2. A numerical control apparatus having a three-dimensional graphic display function according to claim 1, comprising a specific tool lattice data generating means for obtaining a logical-OR of the entire lattice data of a tool which moves only in a direction perpendicular to the plane constituting said lattice data, sequentially determining in the direction of the processing whether or not the lattice data of said tool coincide with said logical-OR, and increasing a continuity number data in said lattice continuity data corresponding to the lattice data for the workpiece which coincides with said logical-OR by the number of lattice points corresponding to the quantity of the movement of the tool.

3. A numerical control apparatus having a three-dimensional graphic display function according to claim 1, comprising a lattice data compressing means for determing whether or not adjoining lattice data of said workpiece are the same, registering the memory area of one of the adjoining lattice data as a re-usable memory area, taking the link data in said lattice continuity data corresponding to the lattice data preceding said one of the lattice data as the physical address of the lattice data succeeding said one of the lattice data, and adding the continuity data in said one of the lattice data to the continuity data in the lattice continuity data corresponding to the other lattice data.

4. A numerical control apparatus having a three-dimensional graphic display function according to claim 1, comprising a lattice data deleting means for presetting the maximum number of the lattice data of said workpiece, counting the number of workpiece lattice data increased as a result of processing, registering the memory area for lattice data in excess as a re-usable memory area when the total number of said workpiece lattice data exceeds said maximum value as a result of processing, taking the link data in the lattice continuity data corresponding to the lattice data preceding said lattice data in excess as the physical address of the lattice data succeeding said lattice data in excess, and adding a continuity number data in said lattice data in excess to a continuity number data in the lattice continuity data corresponding to the lattice data adjoining said lattice data in excess.

5. A numerical control apparatus having a three-dimensional graphic display function according to claim 4, wherein said lattice data deleting means extracts the lattice data having the least continuity number data in the same lattice data as candidates for said re-usable memory area in changing the memory area of said lattice data in excess to the re-usable memory area.

6. A numerical control apparatus having a three-dimensional graphic display function according to claim 5, wherein among from said candidates for the re-usable memory area extracted, that having the smallest number of lattice points in which the form of the material or the tool exists is extracted as a candidate for the re-usable memory area.

7. A numerical control apparatus having a three-dimensional graphic display function according to claim 6, wherein among from said candidates for the re-usable memory area extracted, that having the largest coordinate value in the direction of said axis is determined to be said re-usable memory area.

8. A numerical control apparatus having a three-dimensional graphic display function according to claim 5, wherein among from said candidates for the re-usable memory area extracted, that having the largest coordinate value in the direction of said axis is determined to be said re-usable memory area.

9. A numerical control apparatus having a three-dimensional graphic display function according to claim 5, wherein the number of lattice points in said lattice data of the workpiece is counted; the differences in said numbers of lattice points between a plurality of lattice data are obtained; and, among from the lattice data having the least continuity number data in the same lattice data, the lattice data which are the smallest in difference in the number of lattice points from that of the lattice data adjoining said lattice data having the least continuity number of the same lattice data on the lattice data in the direction of said axis are extracted as candidates for said re-usable memory area.

10. A numerical control apparatus having a three dimensional graphic display function according to claim 9, wherein among from said candidates for the re-usable memory area extracted, that having the largest coordinate value in the direction of said axis is determined to be said re-usable memory area.

11. A numerical control apparatus having a three-dimensional graphic display function according to claim 9, wherein among from said candidates for the re-usable memory area extracted, that having the smallest number of lattice points in which the form of the material or the tool exists is extracted as a candidate for the re-usable memory area.

12. A numerical control apparatus having a three-dimensional graphic display function according to claim 11, wherein among from said candidates for the re-usable memory area extracted, that having the largest coordinate value in the direction of said axis is determined to be said re-usable memory area.

13. A numerical control apparatus having a three-dimensional graphic display function according to claim 4, wherein the number of lattice points in said lattice data of the workpiece is counted; the differences in said numbers of lattice points between a plurality of lattice data are obtained; and, among from the lattice data having the least continuity number data in the same lattice data, the lattice data which are the smallest in difference in the number of lattice points from that of the lattice data adjoining said lattice data having the least continuity number of the same lattice data on the lattice data in the direction of said axis are extracted as candidates for said re-usable memory area.

14. A numerical control apparatus having a three-dimensional graphic display function according to claim 13, wherein among from said candidates for the re-usable memory area extracted, that having the smallest number of lattice points in which the form of the material or the tool exists is extracted as a candidate for the re-usable memory area.

15. A numerical control apparatus having a three-dimensional graphic display function according to claim 14, wherein among from said candidates for the re-usable memory area extracted, that having the largest coordinate value in the direction of said axis is determined to be said re-usable memory area.

16. A numerical control apparatus having a three-dimensional graphic display function according to claim 13, wherein among from said candidates for the re-usable memory area extracted, that having the largest coordinate value in the direction of said axis is determined to be said re-usable memory area.

* * * * *